US007234766B2

(12) United States Patent
Uchida et al.

(10) Patent No.: US 7,234,766 B2
(45) Date of Patent: Jun. 26, 2007

(54) VEHICLE ROOF STRUCTURE

(75) Inventors: Tadayuki Uchida, Wako (JP); Harutaka Maruyama, Wako (JP); Nobuyuki Toyoda, Wako (JP); Etsuko Karube, Haga-gun (JP)

(73) Assignee: Honda Motor Co., Ltd., Tokyo (JP)

( * ) Notice: Subject to any disclaimer, the term of this patent is extended or adjusted under 35 U.S.C. 154(b) by 62 days.

(21) Appl. No.: 11/300,921

(22) Filed: Dec. 15, 2005

(65) Prior Publication Data

US 2006/0131934 A1 Jun. 22, 2006

(30) Foreign Application Priority Data

Dec. 20, 2004 (JP) ............................ 2004-367828
Dec. 20, 2004 (JP) ............................ 2004-367829

(51) Int. Cl.
*B62D 25/06* (2006.01)

(52) U.S. Cl. ...................................... 296/210; 296/213

(58) Field of Classification Search ................ 296/210, 296/213

See application file for complete search history.

(56) References Cited

U.S. PATENT DOCUMENTS 5,013,083 A * 5/1991 Yada et al. ................. 296/213
7,029,060 B1 * 4/2006 Osterberg et al. ...... 296/203.03

FOREIGN PATENT DOCUMENTS

JP 3563179 6/2004

* cited by examiner

*Primary Examiner*—Joseph D. Pape
(74) *Attorney, Agent, or Firm*—Rankin, Hill, Porter & Clark LLP

(57) ABSTRACT

In a vehicle roof structure, a roof panel has a central opening in which a roof glass is supported. A roof molding is mounted to molding mounting grooves that are formed along connecting portions between the roof panel and roof side rails extending along the roof panel. The roof molding includes a molding body and support legs. The molding body also includes: a lip portion that is formed at one side edge thereof and protrudes out of the molding mounting groove to cover a peripheral edge of the roof glass; and an inclined portion which is formed at the other side edge thereof and is inclined smoothly toward a bottom of the molding mounting groove. Therefore, the molding body continuously covers a region from the roof glass to the roof side rail, thereby improving the appearance, and further makes inconspicuous a recess defined by the molding mounting groove and the inclined portion, thereby minimizing the influence of the recess on the roof appearance, while rain water coming from the side of the roof panel is prevented from flowing over the roof side rail.

4 Claims, 4 Drawing Sheets

16 21 21b 12 23b 11 15 15d 21a 21c 23 20 11c 11a 25 15a 24 11e 22 22a 19 11d 17 11b 23a W1 18a 15c 15b W2 18b 18

V
11
12
13
14
15
16
31
32
33
34
36
39
2

12
11a
17
18a
W1
20
18
21b
11d
25
16
11
11c
23
21
18b
24
19
W2
11b
15b
21c
39
21a
15a
22
42a
41a
42
42b
41
40
15

12
20
17
11a
18a
W1
11d
18
25
21b
11
11c
11e
23a
23b
23
16
21
18b
24
19
21c
22a
11b
W2
15b
21a
15d
22
15c
15a
15

VEHICLE ROOF STRUCTURE

RELATED APPLICATION DATA

Japanese priority application Nos. 2004-367828 and 2004-367829, upon which the present application is based, are hereby incorporated in their entirety herein by reference.

BACKGROUND OF THE INVENTION

1. Field of the Invention

The present invention relates to a vehicle roof structure comprising: a roof panel for supporting a roof glass at an opening provided in its central portion; roof side rails; molding mounting grooves formed along connecting portions between the roof panel and the roof side rails; and roof moldings mounted to the molding mounting grooves.

2. Description of the Related Art

Japanese Patent No. 3563179 discloses a vehicle roof structure, in which a roof glass is mounted in a large opening formed in a roof panel of a vehicle, and clearances between left and right side edges of the roof glass and left and right roof side rails are covered with roof moldings (garnishes).

However, this conventional roof structure has a problem that continuity between the roof glass and the roof side rails is eliminated to deteriorate the appearance.

SUMMARY OF THE INVENTION

The present invention has been accomplished with the above circumstance in view, and has an object to improve the appearance of connecting portions between a roof glass mounted on a roof panel and roof side rails.

In order to achieve the above-mentioned object, according to a first feature of the present invention, there is provided a vehicle roof structure comprising: a roof panel for supporting a roof glass at an opening provided in its central portion; roof side rails; molding mounting grooves formed along connecting portions between the roof panel and the roof side rails; and roof moldings mounted to the molding mounting grooves, wherein each of the roof moldings includes a molding body integrally having a support leg fitted in the molding mounting groove, and wherein the molding body includes: a lip portion which is formed at one side edge thereof and protrudes out of the molding mounting groove to cover a peripheral edge of the roof glass; and an inclined portion which is formed at the other side edge thereof and is inclined smoothly toward a bottom of the molding mounting groove.

With the above arrangement, the roof molding is mounted to each of the molding mounting grooves which are formed along the connecting portions between the roof panel for supporting the roof glass at the opening provided in its central portion and the roof side rails; the roof molding includes the molding body and the support leg; the molding body also includes the lip portion which is formed at one side edge thereof and protrudes out of the molding mounting groove to cover the peripheral edge of the roof glass, and the inclined portion which is formed at the other side edge thereof and is inclined smoothly toward the bottom of the molding mounting groove. Therefore, not only does the molding body continuously cover the region from the roof glass to the roof side rail, thereby improving the appearance, but also the lip portion protects the peripheral edge of the roof glass. Further, the recess defined by the molding mounting groove and the inclined portion is made inconspicuous, thereby minimizing the influence of the recess on the appearance, while rain water coming from the side of the roof panel is prevented from flowing over the roof side rail.

According to a second feature of the present invention, in addition to the first feature, the roof molding has a core attached on the molding body and the support leg.

With the above arrangement, the core attached on the molding body and the support legs of the roof molding enhances the rigidity of the molding body and the support leg even if the molding body is formed to have a small wall thickness, thereby reliably retaining the roof molding on the support legs.

According to a third feature of the present invention, in addition to the second feature, the molding body is disposed to straddle over the roof panel and the roof glass, and the core is embedded at least in a portion of the molding body abutting against a carrier base of a roof carrier and the roof panel.

With the above arrangement, the core is embedded at least in a portion of the molding body disposed to straddle the roof panel and the roof glass, the portion abutting against the carrier base of the roof carrier and the roof panel. Therefore, a load applied by the carrier base is effectively transmitted to the roof panel without being transmitted to the roof glass, thereby reliably preventing breaking of the roof glass.

According to a fourth feature of the present invention, in addition to the third feature, the core extends from the molding body of the roof molding to the support leg.

With the above arrangement, the core extends from the molding body of the roof molding to the support legs to enhance the rigidity of the support legs, thereby reliably retaining the roof molding in the molding mounting groove.

An outer support leg 22 and an inner support leg 23 in an embodiment correspond to the support leg of the present invention, and an inner lip portion 21*b* in the embodiment corresponds to the lip portion of the present invention.

DETAILED DESCRIPTION OF THE PREFERRED EMBODIMENT

The present invention will now be described by way of one embodiment with reference to FIGS. 1 to 3.

Figure 1:
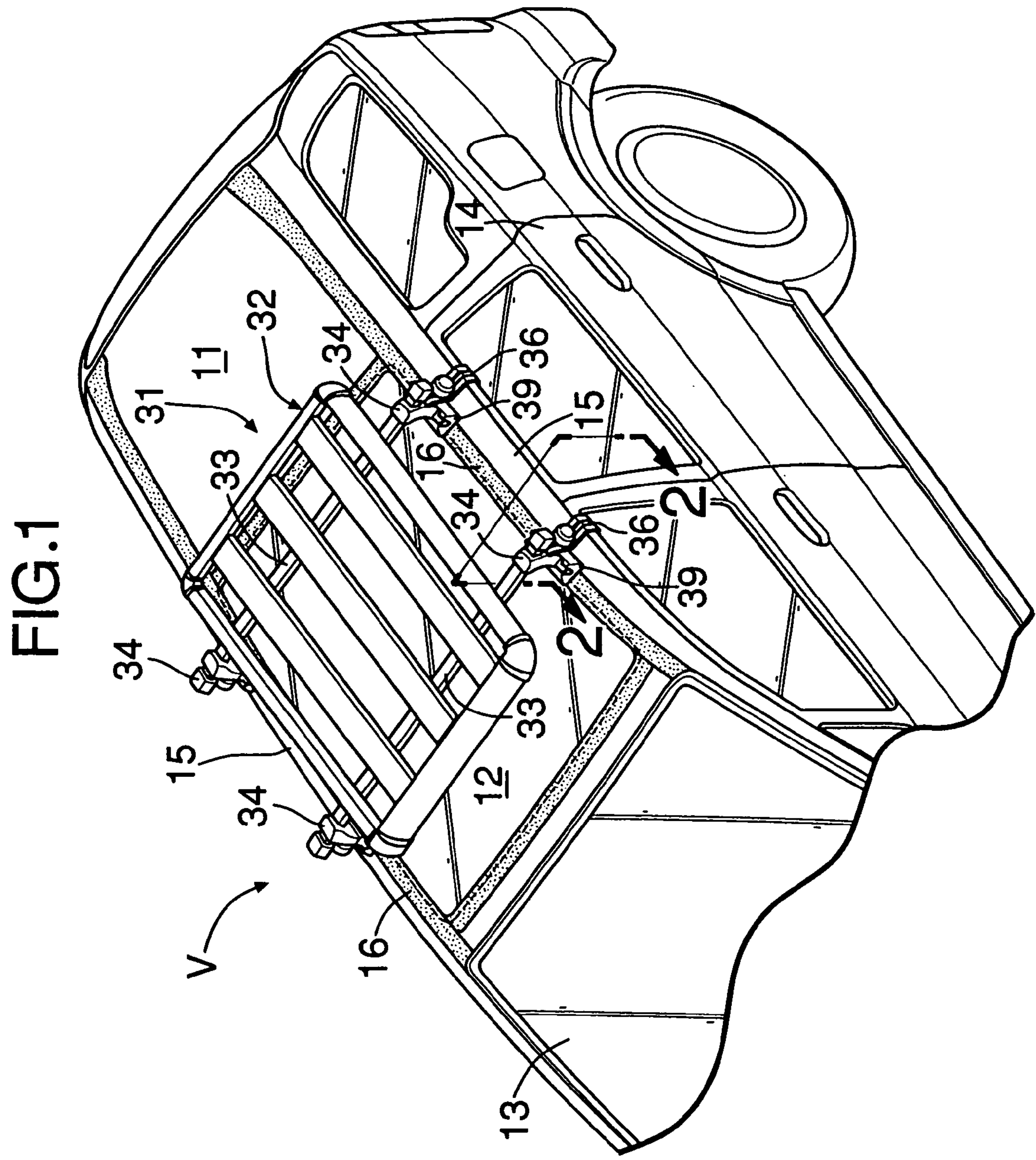
FIG. 1 is a partial perspective view of sport utility vehicle including a vehicle roof structure according to one embodiment of the present invention.

As shown in FIG. 1, a large-sized roof glass 12 is mounted at a front portion of a roof panel 11 of a vehicle V. The roof glass 12 extends in a longitudinal direction of a vehicle body from the vicinity of an upper end of a front glass 13 to the vicinity of a rear end of a rear door 14, and extends in a lateral direction of the vehicle body to be connected to left and right roof side rails 15, 15. Roof moldings 16, 16 extending in the longitudinal direction of the vehicle body are mounted to boundaries between the left and right roof side rails 15, 15 and the roof panel 11.

Figure 2:
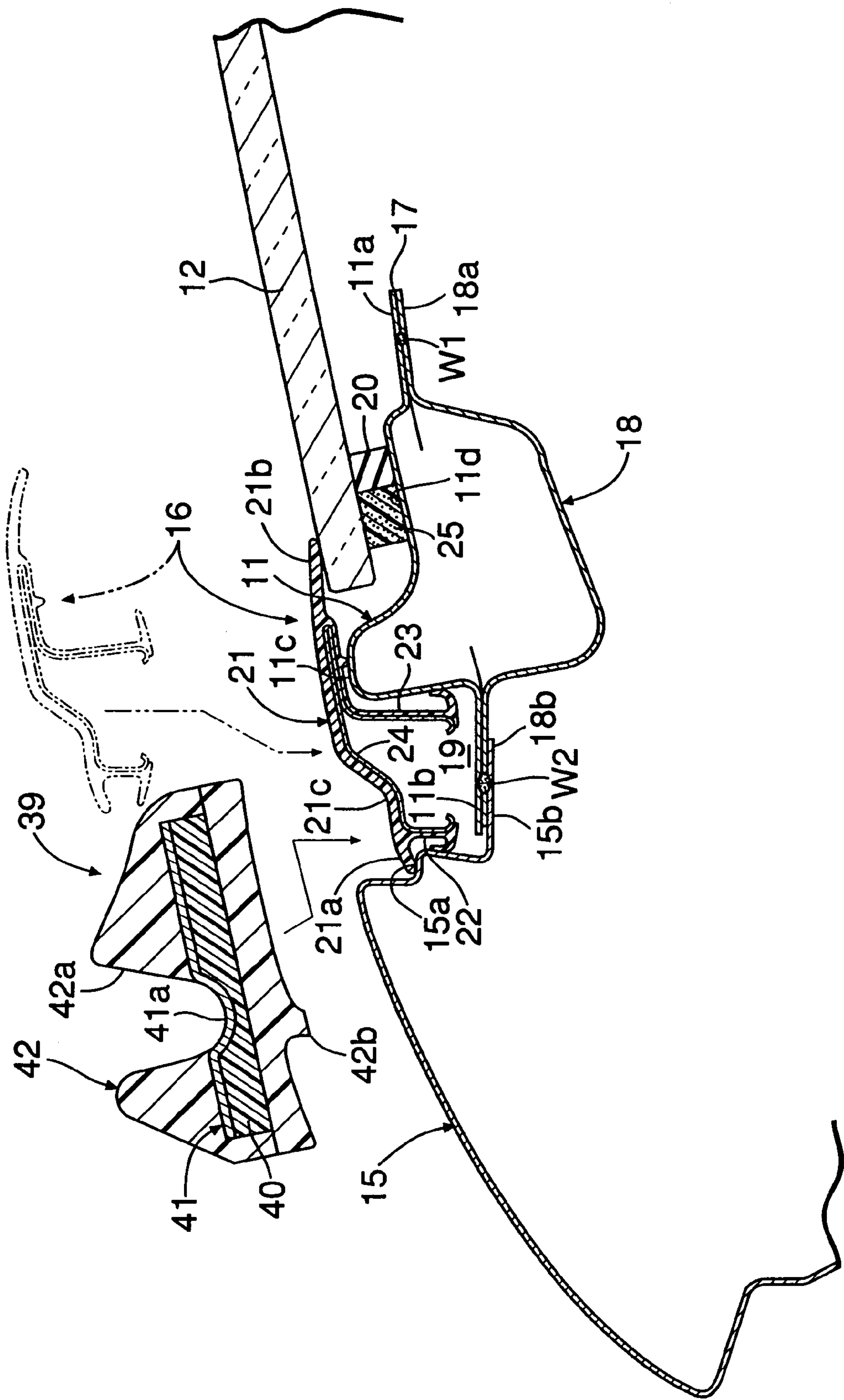
FIG. 2 is an enlarged sectional view taken along a line 2-2 in FIG. 1.

As shown in FIG. 2, an opening 17 for mounting the roof glass 12 is formed in a central portion of the roof panel 11. A stiffener 18 is welded at W1 and W2 to a lower surface of the roof panel 11, thereby reinforcing a peripheral edge of the opening 17. Specifically, inner and outer flanges 11*a* and

11*b* of the roof panel 11 and inner and outer flanges 18*a* and 18*b* of the stiffener 18 are welded to each other, whereby the roof panel 11 and the stiffener 18 form a closed section in a region surrounding the opening 17. Formed in a portion of the roof panel 11 between the inner and outer flanges 11*a* and 11*b* are an outwardly-projecting projection 11*c* located in a position outside the widthwise direction of the vehicle body, and a flat portion 11*d* located inside the projection 11*c* in the widthwise direction of the vehicle body.

An inner end portion of the roof side rail 15 in the widthwise direction of the vehicle body is folded downward. A generally horizontal step 15*a* is formed in an intermediate portion of the downwardly-folded portion. A flange 15*b* folded inward in the widthwise direction is formed at a lower end of the downward folded portion. The flange 15*b* of the roof side rail 15 is superposed on and welded at W2 to the outer flanges 11*b* and 18*b* of the roof panel 11 and the stiffener 18 in the widthwise direction of the vehicle body, whereby a molding mounting groove 19 extending in the longitudinal direction of the vehicle body is formed between the roof panel 11 and the roof side rail 15. The peripheral edge of the roof glass 12 is fixed to the flat portion 11*d* of the roof panel 11 via a dam rubber 20 and an adhesive 25. In this state, an upper surface of the peripheral edge portion of the roof glass 12 is arranged at substantially the same height as an upper surface of the projection 11*c* of the roof panel 11.

Figure 3:
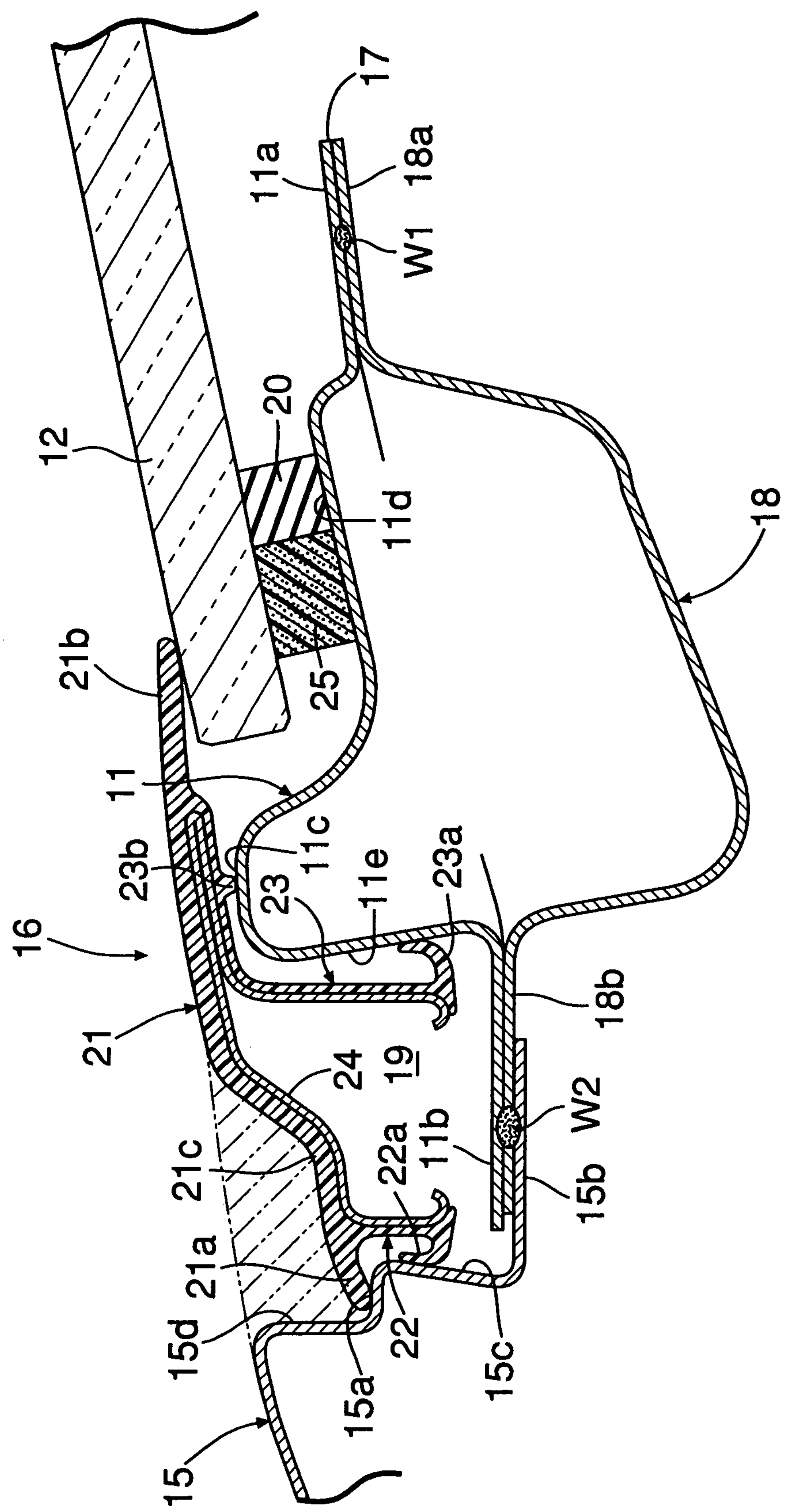
FIG. 3 is an enlarged view of an essential portion of FIG. 2.

A shown in FIGS. 2 and 3, the roof molding 16 includes a molding body 21 exposed from the molding mounting groove 19, and an outer support leg 22 and an inner support leg 23 extending downward from the molding body 21. The molding body 21, the outer support leg 22 and the inner support leg 23 are molded integrally with a core 24. One end of the core 24 folded in two extends on the molding body 21 and the outer support leg 22, and the other end extends on the inner support leg 23. Because the core 24 is mounted so as to extend on the molding body 21, the outer support leg 22 and the inner support leg 23 of the roof molding 16 as described above, the rigidity of the roof molding 16 is enhanced even if the roof molding 16 is formed to have a small wall thickness, thereby reliably retaining the roof molding 16 on the outer support leg 22 and the inner support leg 23.

The molding body 21 includes an outer lip portion 21*a* protruding from the core 24 toward the roof side rail 15, an inner lip portion 21*b* protruding from the core 24 toward the roof glass 12, and an inclined portion 21*c* inclined downward at an outer portion in the widthwise direction of the vehicle body in the vicinity of the roof side rail 15.

When the roof molding 16 is mounted in the molding mounting groove 19 between the roof panel 11 and the roof side rail 15, an outer claw 22*a* provided at a lower end of the outer support leg 22 abuts against an inner wall 15*c* below the step 15*a* of the roof side rail 15 to be resiliently deformed upward, and an inner claw 23*a* provided at a lower end of the inner support leg 23 resiliently abuts against an inner wall 11*e* below the projection 11*c* of the roof panel 11 to be resiliently deformed upward, whereby the roof molding 16 is firmly retained in the molding mounting groove 19. In this arrangement, a protrusion 23*b* projectingly provided on a lower surface of an upper portion of the inner support leg 23 abuts against an upper surface of the projection 11*c* of the roof panel 11, thereby defining the vertical position of the roof molding 16.

As a result, the outer lip portion 21*a* of the molding body 21 of the roof molding 16 resiliently abuts against an upper surface of the step 15*a* of the roof side rail 15, and the inner lip portion 21*b* of the molding body 21 resiliently abuts against an upper surface of the roof glass 12. Further, as shown by oblique lines in FIG. 3, a rain water receiving volume is ensured by an inner wall 15*d* above the step 15*a* of the roof side rail 15 and the inclined portion 21*c* of the molding body 21 of the roof molding 16.

Figure 4:
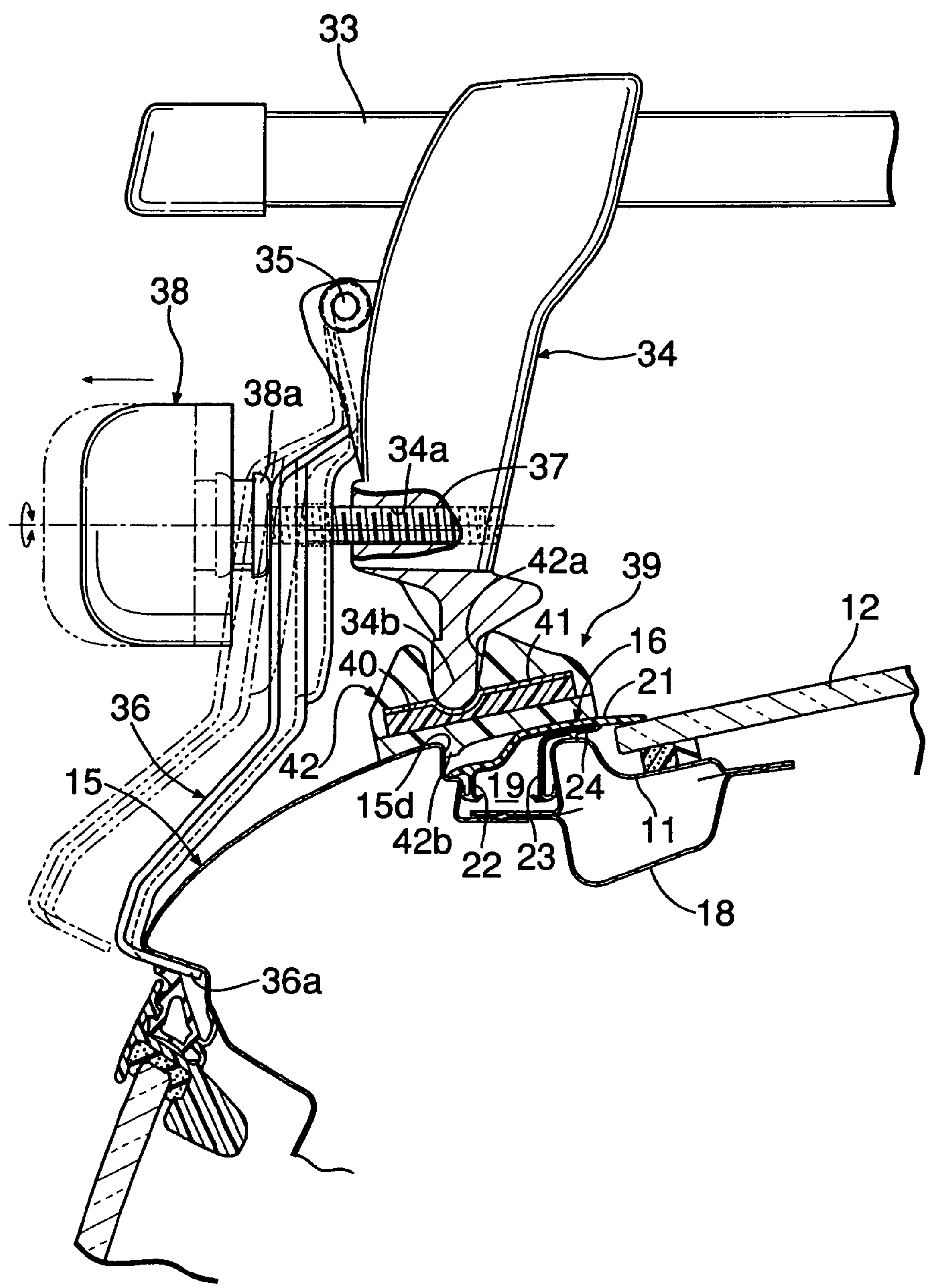
FIG. 4 is a view showing a roof carrier in a mounted state.

As shown in FIGS. 1 and 4, a roof carrier 31 mounted on a roof of the vehicle V includes: a rectangular-frame-shaped carrier body 32 for carrying articles; two front and rear cross members 33, 33 extending in the widthwise direction of the vehicle body so as to support a lower surface of the carrier body 32; legs 34, 34 fixed to laterally opposite ends of each cross member 33; a clamp member 36 swingably supported at its upper end on each leg 34 via a support shaft 35; a bolt 37 passed through the clamp member 36 and threadedly engaged with a female thread 34*a* of the leg 34; and a knob 38 for operating the bolt 37. An abutment 34*b* having an arcuate sectional shape is formed at a lower end of the leg 34, and a locking portion 36*a* is formed at a lower end of the clamp member 36 and folded for engagement with a side end edge of the roof side rail 15.

A carrier base 39 adapted to cooperate with the roof carrier 31 comprises a metal plate 41 with its lower surface supported by a synthetic resin backing plate 40, and a rubber body 42 covering the backing plate 40 and the metal plate 41. A groove 42*a* is formed on an upper surface of the body 42 so that the abutment portion 34*b* of the leg 34 is fitted into the groove 42*a*. An arcuate recess 41*a* is formed in the metal plate 41 to face a bottom of the groove 42*a*. A locking projection 42*b* projecting from a lower surface of the body 42 is capable of abutting against a wall surface 15*d* of the roof side rail 15.

Thus, the molding body 21 of the roof molding 16 is mounted in the molding mounting groove 19 formed along the connecting portions between the roof panel 11 and the roof side rail 15; and has at its one side edge the inner lip portion 21*b* protruding out of the molding mounting groove 19 to cover the peripheral edge of the roof glass 12, and at its other end edge the inclined portion 21*c* smoothly inclined to a bottom of the molding mounting groove 19. Therefore, not only a region from the roof side rail 15 to the roof glass 12 is continuously covered with the molding body 21 to improve the appearance, but also the edge of the roof glass is covered and protected with the inner lip portion 21*b*.

Moreover, the recess defined by the molding mounting groove 19 and the inclined portion 21*c* is formed on the side of the roof side rail 15 of the molding mounting groove 19 so as to be inconspicuous, while rain water coming from the side of the roof panel 11 is prevented from flowing over the roof side rail 15, thereby minimizing the influence of the recess to the appearance.

To fix the roof side carrier 31 to the vehicle body, two left and right carrier bases 39 are first mounted so as to straddle over the roof side rail 15 and the roof molding 16. In this arrangement, the locking projection 42*b* projectingly provided on the lower surface of the body 42 of each carrier base 39 is brought into engagement with the inner wall 15*d* of the roof side rail 15.

Next, the abutment portion 34*b* at the lower end of each of the four legs 34 of the roof carrier 31 is fitted into the groove 42*a* of the body 42 of the corresponding carrier base 39 to abut against the recess 41*a* in the metal plate 41, and the locking portion 36*a* of the clamp member 36 is brought into engagement with the side end edge of the roof side rail 15.

In this state, when the bolt 37 is threadedly fitted into the female thread 34*a* of the leg 34 by operating the knob 38, the clamp member 36 is pushed by a pushing portion 38*a* of the knob 38 and swings about the support shaft 35, whereby the locking portion 36*a* of the clamp member 36 and the abutment portion 34*b* of the leg 34 approach each other. As a result, the locking portion 36*a* of the clamp member 36 is strongly pressed on the side end edge of the roof side rail 15; the groove 42*a* is pressed on the abutment portion 34*b* of the leg 34; and the locking projection 42*b* of the carrier base 39 is strongly pressed on the inner wall 15*d* of the roof side rail 15, whereby the roof carrier 31 is fixed above the roof.

The weight of the roof carrier 31 and the articles mounted on the roof carrier 31 acts on the carrier bases 39, a portion thereof is supported directly on the roof side rails 15 via the carrier bases 39, and the other portion thereof is supported on the projection 11*c* of the roof panel 11 via the molding bodies 21 of the roof moldings 16. In this arrangement, because the core 24 is embedded in the molding body 21 abutting against the carrier base 39 and the projection 11*c* of the roof panel 11 and is thickened by being folded in two, the loads of the carrier bases 39 are effectively transmitted to and supported on the projection 11*c* of the roof panel 11. Moreover, because the portion of the molding body 21 covering the roof glass 12 is the inner lip portion 21*b* having a flexibility, it is possible to reliably prevent the load from being transmitted to the roof glass 12 to break the roof glass 12.

Although the embodiment of the present invention has been described in detail, various modifications in design may be made without departing from the subject matter of the invention.

For example, the RV vehicle has been illustrated in the embodiment, but the present invention is also applicable to any other type of vehicle.

What is claimed is:

1. A vehicle roof structure comprising:

a roof panel having a central portion and being adapted to support a roof glass at an opening in said central portion;

roof side rails extending along said roof panel;

molding mounting grooves formed along connecting portions between the roof panel and the roof side rails; and roof moldings mounted to the molding mounting grooves, each roof molding including a molding body integrally having a support leg fitted in the molding mounting groove, and wherein the molding body comprises:

a lip portion which is formed at one side edge of said molding body and protrudes out of the molding mounting groove to cover a peripheral edge of the roof glass; and an inclined portion which is formed at a second side edge of the molding body and is inclined smoothly toward a bottom of the molding mounting groove.

2. A vehicle roof structure according to claim 1, wherein the roof molding has a core attached on the molding body and the support leg.

3. A vehicle roof structure according to claim 2, wherein the molding body is disposed to straddle over the roof panel and the roof glass, and the core is embedded at least in a portion of the molding body abutting against a carrier base of a roof carrier and the roof panel.

4. A vehicle roof structure according to claim 3, wherein the core extends from the molding body of the roof molding to the support leg.

* * * * *